United States Patent
Von Wedel

(10) Patent No.: US 6,745,893 B2
(45) Date of Patent: Jun. 8, 2004

(54) BEARING SYSTEM FOR THE SWINGING SUSPENSION OF THE SWING FRAME OF A CONVEYOR GRATE

(76) Inventor: Karl Von Wedel, Gerberhof 5, 31535 Neustadt (DE)

(\*) Notice: Subject to any disclaimer, the term of this patent is extended or adjusted under 35 U.S.C. 154(b) by 24 days.

(21) Appl. No.: 10/121,142

(22) Filed: Apr. 11, 2002

(65) Prior Publication Data

US 2002/0148705 A1 Oct. 17, 2002

(30) Foreign Application Priority Data

Apr. 12, 2001 (DE) .......................... 101 18 440

(51) Int. Cl.[7] .............................................. B65G 27/00
(52) U.S. Cl. ...................... 198/763; 198/758; 198/759; 198/771; 198/752.1
(58) Field of Search .............................. 198/752.1, 771, 198/763, 759, 758

(56) References Cited

U.S. PATENT DOCUMENTS

| | | | | |
|---|---|---|---|---|
| 2,876,891 A | * | 3/1959 | Long et al. .................. | 198/763 |
| 3,467,241 A | * | 9/1969 | Oser .......................... | 198/760 |
| 3,834,523 A | * | 9/1974 | Evans ......................... | 198/763 |
| 4,162,778 A | * | 7/1979 | Kraft .......................... | 248/610 |
| 5,853,082 A | * | 12/1998 | Buckley et al. .......... | 198/752.1 |
| 6,536,750 B1 | * | 3/2003 | Martin ....................... | 267/136 |

FOREIGN PATENT DOCUMENTS

| | | |
|---|---|---|
| DE | 318925 | 8/1955 |
| DE | 32 31 947 | 3/1984 |
| DE | 3844493 | 12/1988 |
| WO | 98/40683 | 9/1998 |

\* cited by examiner

*Primary Examiner*—Richard Ridley
(74) *Attorney, Agent, or Firm*—Collard & Roe, P.C.

(57) ABSTRACT

A bearing system which is for suspending the swing frame of a conveyor grate in a swinging manner on a support structure. Two elastic spring rods are arranged next to each other in a common plane of swinging. The spring rods have a first end clamped in a fixed manner on clamping points of a first structural component. The second ends of the spring rods are clamped in a fixed manner to connection points on a rigid coupling system. The rigid coupling system is connected with the second structural component. The spring rods are inclined toward each other in the swinging plane. The coupling system is connected with the second structural component so that it can be tilted in the swinging plane via a flexible connection. Because of the inclination of the spring rods, when they are jointly deflected, one of the spring rods always describes a downward arc and the other an upward arc. It is possible to find on the coupling system connecting the lower ends of the spring rods an area that substantially is carrying out an at least quasi-linear movement. The invention guides the swing frame in a substantially linear way.

12 Claims, 2 Drawing Sheets

BEARING SYSTEM FOR THE SWINGING SUSPENSION OF THE SWING FRAME OF A CONVEYOR GRATE

CROSS-REFERENCE TO RELATED APPLICATIONS

Applicant claims priority under 35 U.S.C. §119 of German Application No. 101 18 440.9 filed Apr. 12, 2001.

BACKGROUND

The present invention relates to a bearing system for suspending the swing frame of a conveyor grate in a swinging manner on a support structure. The bearing system comprises two elastic spring rods arranged next to each other in a common swinging plane. The first ends of the spring rods are clamped in a fixed manner in clamping points on a first structural component, such as the support structure. Their second ends are clamped in a fixed manner at connection points of a rigid coupling system. The coupling system is connected to the second structural component, the swing frame.

Conveyor grates generally have a multitude of grate rows, which are successively arranged one after the other and overlap one another in a step-like manner. Each second or third row can be moved back and forth, which periodically moves the material transported on the grates (i.e. cement clinker). The movable grate rows of a conveyor grate system are generally arranged on a common swing frame. The swing frame is moved back and forth by a swing drive. The grate rows have grate elements that are secured on grate supports. Thrust gaps exist between the moving and the fixed rows of grates. These gaps are the cause of grate wear and should be as narrow as possible. The size of the gap is a measure of the quality of the thrust grates. Narrow gaps can be kept clear of the material to be cooled by a high velocity cooling air. With large gaps and accordingly coarser material, the amount of cooling air required would be unjustifiably high. Material penetrating the thrust gaps causes wear in the area of the thrust gap, leading to an increase of grate loss, or material dropping through the gaps.

In the ideal case, the swing frame is moving in a linear way, so that the thrust gaps maintain their width as the swing frame is swinging. Gap width is predetermined in constructing the system. Support swing frames with linear mobility on rollers are known in the art. However, the wear of roller bearings leads to an undesired change of the width of the thrust gap.

In order to avoid linear bearings, DE 38 44 493 (von Wedel) proposes to suspend the one or more swing frames in a swinging manner on long leaf springs or spring rods. A basic drawback of swinging suspension is that the swinging movement causes a circular arc, wherein the swing frame and the rows of grates connected with the frame move along a circular arc as well. This makes it necessary to dimension the width of the thrust gap so that the vertical component of the circular arc movement is possible without causing the movable rows of grates to come into contact with the fixed rows of grates. On the average, this results in a relatively large thrust gap width and the undesirable consequences described above. The vertical component of the circular arc movement becomes smaller as the pendulums become longer. Long pendulums, however, lead to an increased structural height and increased space requirements for the entire conveyor grate system.

A bearing device of the type described above has been described in WO 98/40683, in particular FIG. 3 of the patent. The bearing system has two elastic spring rods 7b, which are clamped in a fixed manner to the support structure and arranged next to each other in a common swing plane. The lower ends of the spring rods are connected with a rigid coupling system 13 via a fixed clamping system. The coupling arrangement is connected with the swing frame. The two spring rods 7b are arranged parallel with each other. The fixed coupling system 13 is connected with the swing frame at point 9 via another spring rod 7a. The structural length of the pendulums is halved by dividing the spring rods into two spring rod segments.

Forces are transmitted via the coupling arrangement from the lower end of the two first spring rod segments to the upper suspension point of the other spring rod segment. The lower end of the other segment is secured on the swing frame. The spring rod segments are inserted into one another in this manner and the structural height is substantially reduced to the length of the spring rod segments. Since the first spring rods are aligned parallel with each other, their movement results in a parallelogram displacement. The coupling system is moving along a circular arc corresponding with the circular arc described by the lower ends of the first spring rods. The spring rod secured on the coupling arrangement participates in the circular arc movement of the coupling system and additionally performs its own swinging movement that leads to a correspondingly superimposed movement of the swing frame.

A drawback of the known arrangement is that the vertical movement of the swing frame is similar to the movement of the spring frame with an undivided, long pendulum. In practical applications, the spring rod segments are, additionally coupled by coil springs, arranged between the spring rod segments. They transmit the full pendulum deflection introduced into the other spring rod segment to the first spring rod segments, to an extent amounting to half of the deflection. This adjustment is found to be difficult under the varying load conditions because a defined adjustment is always only optimized for one load case.

Another drawback is that the upper suspension point of the additional spring rod segment is located at a high level on the coupling system, and in an unstable manner. This makes it impossible to set an inclined plane of swinging in relation to the center of the conveyor grate, for the purpose of lateral centering in connection with the use of long pendulums.

SUMMARY OF THE INVENTION

The present invention provides a bearing system with the use of spring rods clamped in a fixed manner to a first structural component, where it is possible to achieve a linear or quasi-linear movement of the swing frame suspended in a swinging manner on the supporting structure. The deviation from the linearity must be smaller than the vertical component of the circular arcs of long pendulum systems, and pendulum systems where pendulums are inserted one into another.

According to the invention, spring rods are inclined in the plane of swinging toward one another. Further, the coupling system is connected to the second structural component via a connection (flexible joint) permitting tilting in the plane of swinging.

The consequence of the inclined spring rods is that with each joint deflection of the rods, the end of one spring rod always moves along a downward arc, whereas the end of the other spring rod moves along an upward arc. In this way, a coupling system connected with the spring rods is simultaneously displaced and tilted in the plane of swinging. The downward movement of one end of the coupling system is opposed by an upward movement of the other end of the structural element. An area then exists between the connection points of the spring rods that is moving in a linear or quasi-linear manner with a thrust movement that is adequately long for the application. In this area it is possible to tap the thrust movement of the wing frame.

Since the coupling system is tilted when the two spring rods are deflected, the connection of the coupling system with the second structural component must permit a tilting movement.

In a preferred embodiment of the invention, the spring rods each form the side legs of a trapeze, preferably of a trapeze having equally sized legs. This results in an arrangement that is simple in terms of construction and acts equally in both directions of deflection.

In further developing the invention, the spring rods each extend in a converging manner from their clamping points on the first structural component to the connection points connecting them with the coupling arrangement.

The flexible connection of the coupling system with the second structural component may be arranged in the coupling axis, preferably the center area of the axis. The coupling axis extends through the connection points of the spring rods with the coupling arrangement. However, it may be more favorable for system engineering and functional reasons if the flexible connection is arranged spaced from the coupling axis. This is suitable if the best result of linear movement is obtained in an area located outside of the coupling axis. In preferred embodiments, the flexible connection is located on the side of the coupling axis having the clamping points of the spring rods, and along a line of symmetry of the two spring rods. The coupling system is always moving in a direction corresponding with the movement of the swing frame. The degree of deflection of the spring rods may be less than the degree of useful movement of the swing frame. This is explained in greater detail in the following with the help of the exemplified embodiments. Furthermore, it is possible for the spring rods and the coupling arrangement to be advantageously inserted one into the other, so that a reduction of the structural height of the bearing arrangement is obtained.

A plurality of elastic swinging systems are not inserted one into another. The elastic spring rods always extend only between a structural component that is fixed in the lateral direction and the swing frame or the structural element connected with the swing frame. This makes it possible to set the bearing systems in a slanted way, so that the system leans toward the center of the grate for the purpose of obtaining lateral centering without having to fear that the slant might lead to lateral instability.

According to a preferred embodiment of the invention, the spring rods are suspended from the supporting structure and they support the coupling system on their lower ends. The coupling arrangement is connected with the swing frame via a flexible connection. When a displacement of the swing frame occurs, the coupling arrangement is first driven along the jointed connection. The coupling arrangement deflects the spring rods in the direction in which the swing frame is displaced. The coupling system is carrying out a movement of displacement and a tilting motion around a point disposed at the center of the coupling axis. An area on the coupling system has a resulting movement that is at least a quasi-linear movement, and where the jointed connection with the swing frame is located.

In another embodiment of the invention, the coupling system is connected with the supporting structure via the flexible connection. The spring rods are suspended on the coupling system and support the swing frame on their lower ends. When the swing frame is displaced by means of the swing drive, the spring rods are deflected in the same sense. The spring rods take along the coupling arrangement connected with the supporting structure and tilt the coupling system in the direction in which the swing frame is displaced. Again, the resulting movement of the swing frame is quasi-linear.

Any flexible joint permitting a tilting movement of the coupling system may serve as a flexible connection between the coupling element and each second structural component. However, in order to avoid the wear problems described above in connection with the roller bearings, the flexible connection is formed by deforming structural elements that are arranged between the coupling system and each second structural element. These structural components may be pressure-loaded structural components, such as pressure springs, buffer elements made of elastomeric materials, or bending pressure bars. The deformable structural elements, however, may also be elements loaded by tensile force, including bending torsion bars, ropes etc.

In general, structural elements loaded by tensile force are preferred as flexible connections. So that structural elements acted upon by tensile force can be used as flexible connections, the coupling system has frame-like structure surrounding a window. The flexible connection as a structural element loaded by tensile force is arranged in the window and transmits its load from each second structural element to the leg of the frame facing away from the coupling axis.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views.

DETAILED DESCRIPTION

Figure 1:
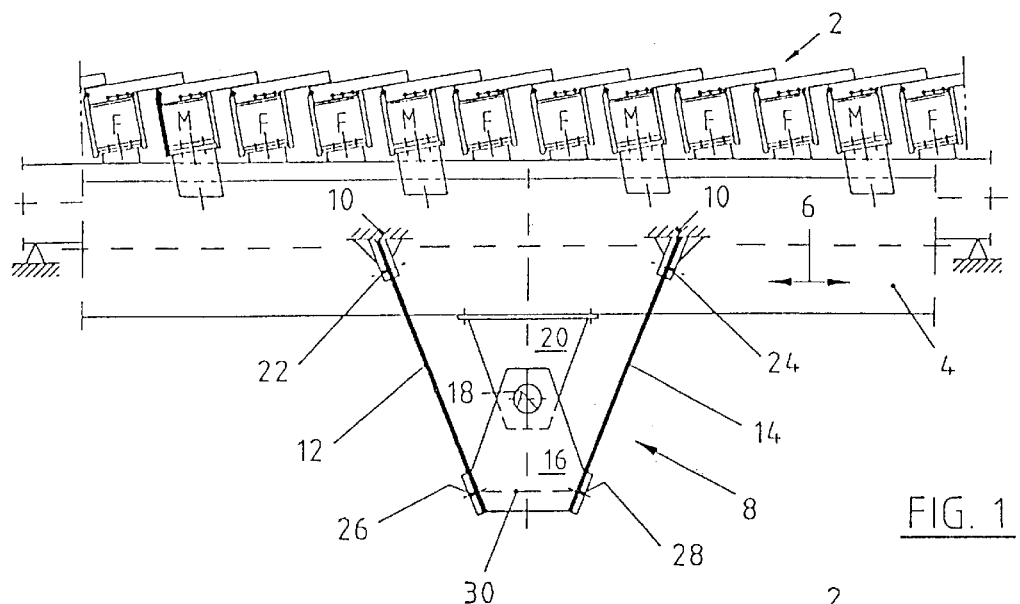
FIG. 1 is a schematic side view of a bearing arrangement in which spring rods are suspended from a support structure and a coupling system is connected to a swing frame.

Referring now in detail to the drawings, FIG. 1 shows a side view of a conveyor grate 2, for cooling burnt cement clinker. Conveyor grate 2 is a stepped grate and comprises two fixed grate rows "F" and one grate row "M", which alternate with each other. Movable grate rows "M" are fixed to a swing frame 4. Swing frame 4 is arranged so that it is movable back and forth in the direction indicated by double arrow 6. The back and forth movement of swing frame 4 is caused by a swing drive which is connected with swing frame 4, but not shown in the drawing.

Swing frame 4 is supported from a fixed support structure 10 of conveyor grate 2 via a plurality of bearing arrangements 8 arranged on both sides of swing frame 4. Only one bearing arrangement 8 can be seen in FIG. 1. Fixed support structure 10 is an independent element, separate from swing frame 4.

Bearing arrangement 8 comprises two spring rods 12 and 14, which are suspended from support structure 10, the first structural component in this embodiment. Spring rods 12, 14 support a coupling arrangement 16 on their lower ends. Coupling arrangement 16 is connected with swing frame 4 via an articulation joint 16 and a connection flange 20, (the second structural component in this embodiment). Articulation joint 18 allows coupling arrangement 16 to tilt.

Spring rods 12 and 14 are clamped and fixed to support structure 10. The sites at which spring rods 12 and 14 are clamped are denoted as clamping points 22 and 24.

Furthermore, spring rods 12 and 14 each are connected with coupling arrangement 16 via fixed clamping. Connection points 26 and 28 are the sites at which spring rods 12 and 14 are connected with coupling arrangement 16. A line connecting connection points 26 and 28 is denoted as a coupling axis 30.

Spring rods 12 and 14 form the side legs of an equally legged trapeze with a line of symmetry 19. Articulation joint 10 is arranged on line of symmetry 19 spaced from coupling axis 30 on the side of clamping points 22 and 24. Spring rods 12 and 14 and coupling system 16 are inserted one into the other.

The weight or swing frame 4 is transmitted to support structure 10 via connection flange 20, articulation joint 18, coupling system 16 and spring rods 12 and 14. When swing frame 4 is displaced to the right, it takes along coupling system 16 via articulation joint 18.

Figure 3:
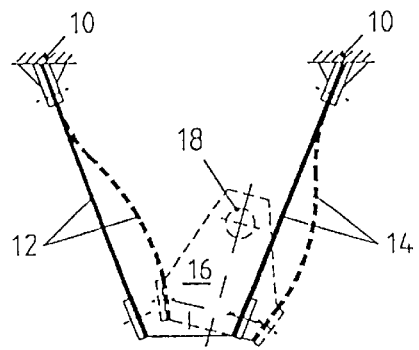
FIG. 3 is a schematic view of the swing frame according to FIG. 1 when displaced to the right.

FIG. 3 shows coupling system 16 being displaced to the right and tilted at the same time. The movement or spring rods 12 and 14 and of coupling system 16 is shown in an exaggerated way for the sake of better understanding. The lower end of spring rod 12 is moving upwards, whereas the lower end of spring rod 14 is moving downwards. It is then possible to find an area on coupling system 16 where the resulting movement is a quasi-linear motion. In the present embodiment, the area is approximately located in the zone of articulation joint 18. Swing frame 4 connected via articulation joint 18 with coupling system 16 is carrying out a quasi-linear movement as well.

FIG. 3 shows that when coupling system 16 is tilted, articulation joint 18 is carrying out a movement to the right, the direction of swing frame 4. The deflection of spring rode 12 and 14 may be smaller than the useful movement of swing frame 4 because the movement of swing frame 4 is composed of the motion of coupling system 16 and the motion and spring rods 12 and 14.

Figure 2:
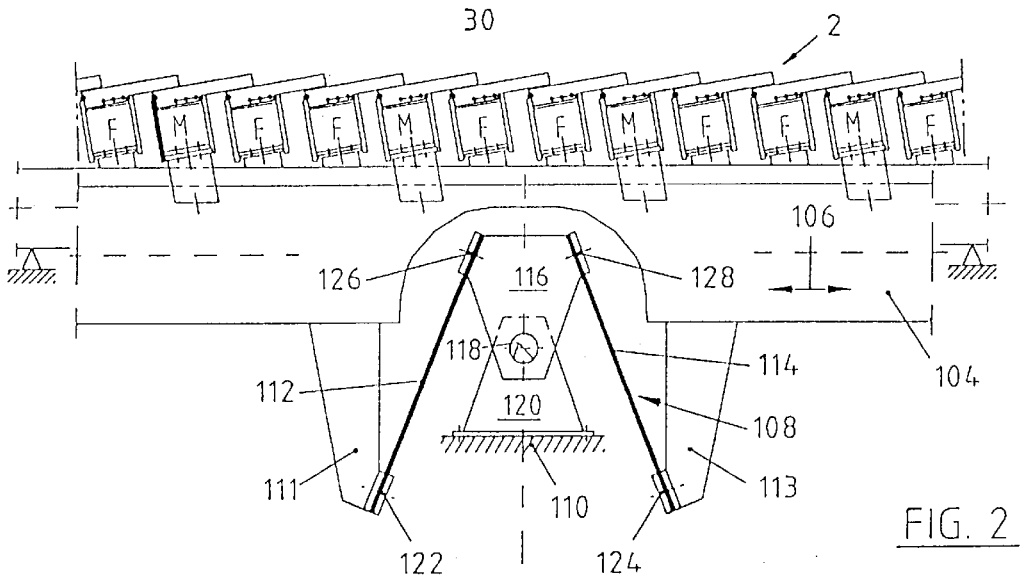
FIG. 2 is a schematic side view of a bearing system in which a coupling system is connected with a supporting structure and springs rods suspended from a coupling system support the swing frame.

FIG. 2 shows another embodiment of the present invention, in which movable grate rows "M" of a conveyor grate 102 with a swing frame 104 are movably arranged, and move in the direction indicated by double arrow 106. Swing frame 104 is supported on a support structure 110 via a plurality of bearing systems. Only one bearing system 108 is shown in FIG. 2. Bearing system 108 has a coupling arrangement 116, which is connected to a support block 120, the second structural component of this embodiment, via a articulation joint 118. Support block 120 is secured on support structure 110. An articulation joint 118 permits coupling system 116 to tilt in the plane of the drawing.

Two spring rods 112 and 114 are suspended from coupling system 116. Spring rods 112 and 114 are connected with coupling system 116 at connection sites 126 and 128, via fixed clamping connections. The lower ends of spring rods 112 and 114 support swing frame 104. These lower ends are connected to connection flanges 111 and 113 at clamping sites 122 and 124. Connection flanges 111 and 113, the first structural component of this embodiment, are secured on swing frame 104.

Figure 4:
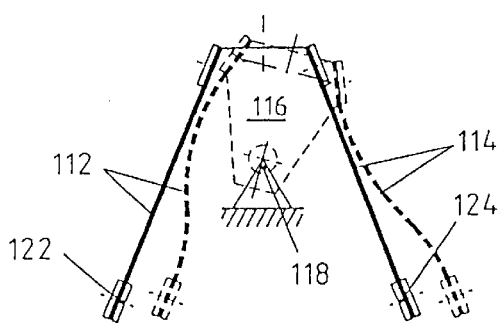
FIG. 4 is a schematic view of the swing frame according to FIG. 2 when displaced to the right.

When swing frame 104 is deflected, for example to the right, it deflects spring rods 112 and 114 to the right in the manner shown (in an exaggerated way in FIG. 4. Without a tilting movement at coupling system 116, clamping point 122 would move along a downward arc and clamping point 124 would move along an upward arc, and swing frame 104 would be tilted counterclockwise. This theoretical tilting movement of swing frame 104 is compensated by tilting coupling system 116 simultaneously clockwise. This movement causes the upper end of spring rod 112 to be lifted and the upper end or spring rod 114 to be lowered. A favorable area exists to arrange articulation joint 118 where the resulting movement of swing frame 104 becomes a quasi-linear motion.

The flexible connection between the coupling system and the second structural component may be a conventional joint in the simplest case. This can comprise a hinge pin that is rotating in an eye of the joint, or a ball that is rotating in a ball block. However, to avoid the wear problems mentioned in connection with the roller bearings, flexible connections that are formed by deformable structural elements are preferred.

Figure 5:
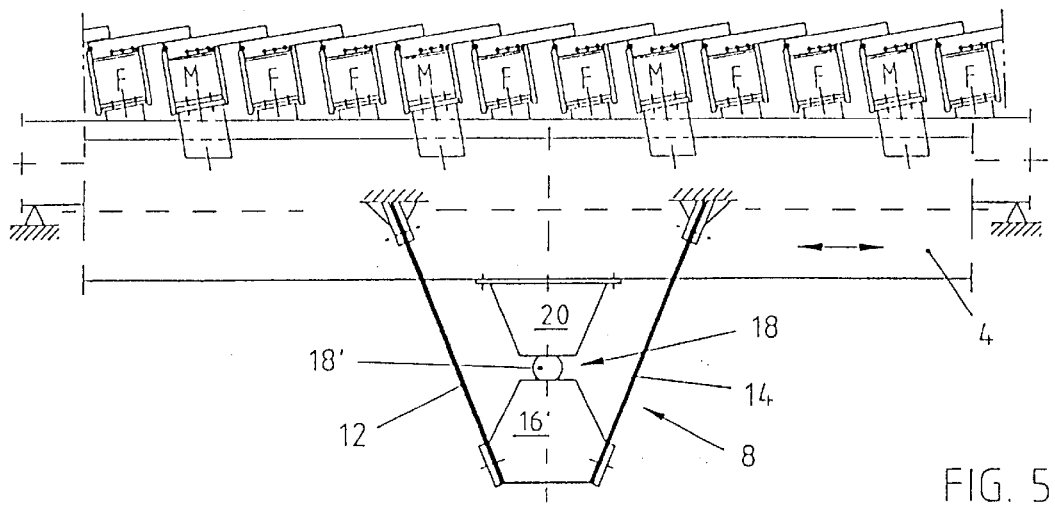
FIG. 5 is a schematic representation according to FIG. 1, with a flexible connection between the coupling system and the swing frame in the form of a pressure-loaded structural element.

FIG. 5 shows an arrangement similar to the one shown in FIG. 1. Structural parts with the same or similar functions are denoted by the same reference numerals as they are in FIG. 1.

FIG. 5 shows that connection flange 20 connected with swing frame 4 is supported on coupling system 16 via articulation joint 18. Articulation joint 18 is formed by a buffer element 18' made of an elastomeric material, which is joined with connection flange 20 and coupling system 16 by vulcanizing. Buffer element 18' could be replaced, by a metallic spring element, notably a bonding pressure bar, conventional pressure springs and the like that permit a tilting movement between coupling system 16 and connection flange 30.

Figure 6:
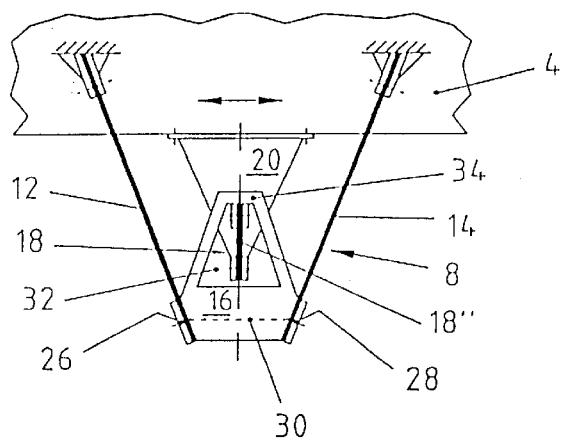
FIG. 6 is a schematic view of an arrangement according to FIG. 1 comprising a flexible connection in the form of a structural element acted upon by tensile force.

FIG. 6 shows bearing arrangement 8 similar to FIG. 1, whereby similar structural components are again denoted by the same reference numerals. A structural element acted upon by tensile force is used in the flexible connection. Coupling system 16 is a frame with a window 32 inside the frame. Coupling system 16 and connection flange 20 overlap each other so that connection flange 20 protrudes into the area of window 32. Articulation joint 18 is a bending tension bar 18", which is arranged in window 32 and transmits the load exerted to a leg 34 of window 32 via connection flange 20.

Figure 7:
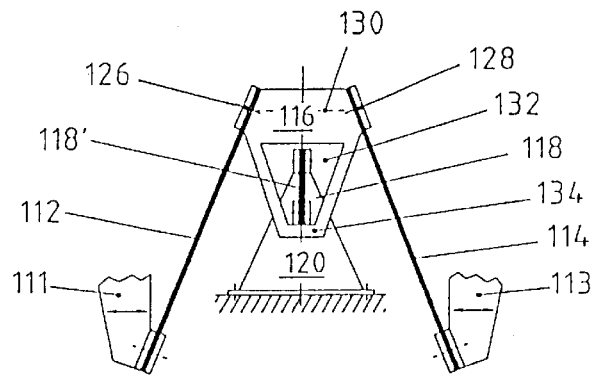
FIG. 7 is a schematic view of an arrangement according to FIG. 2 comprising a flexible connection in the form of a structural element acted upon by tensile force.

FIG. 7 shows a bearing arrangement similar to the one shown in FIG. 2, whereby similar structural components are again denoted by the same reference symbols. A structural component loaded with tensile force is used as articulation joint 118. The coupling system is a frame structure with a window 132 inside the frame. Support block 120 protrudes into window 132. Articulation joint 118 is a bending tension bar 118', which transmits the load expended by the support block 120 to a leg 134 of window 132 facing away from coupling axis 130.

Bending tension bars 18" and 118' are each clamped on their ends in a fixed manner, whereby a short segment remains between the clamping sites where a bending movement can occur without lateral deflection.

Accordingly, while at least one embodiment of the present invention has been shown and described, it is obvious that many changes and modifications may be made thereunto without departing from the spirit and scope of the invention.

What is claimed is:

1. A bearing system for suspending a swing frame of a conveyor grate from a support structure in a swinging manner comprising:
   a first structural component having clamping sites;
   two elastic spring rods arranged in a common swing plane, disposed next to each other and inclined and non-parallel relative to each other, wherein each elastic spring rod has a first end and a second end, and wherein said first ends are clamped in a fixed manner to said clamping sites on said first structural component;
   a coupling system having connection sites, wherein said second ends of said two elastic spring rods are clamped in a fixed manner to said connection sites of said coupling system; and
   a second structural component joined to said coupling system by an articulation joint capable of tilting in the swinging plane;
   wherein said coupling system displaces and tilts when the swing frame is displaced by a swing drive, and wherein an area or said coupling system displaces in a substantially linear manner.

2. The bearing system according to claim 1, wherein said spring rods form the side legs of an equally legged trapeze.

3. The bearing system according to claim 1, wherein said spring rods each are converging from said clamping points in the direction of said connection points with said coupling system.

4. The bearing system according to claim 1, wherein said articulation joint of said coupling system is spaced from a coupling axis which connects said connection points.

5. The bearing system according to claim 4, wherein said articulation joint is disposed on the side of said coupling axis facing said clamping sites.

6. The bearing system according to claim 2, wherein said articulation joint is arranged on a line of symmetry of said trapeze.

7. The bearing system according to claim 1, wherein said first ends of said spring rods are suspended from at least one support block, wherein said second ends support said coupling system, and wherein said coupling system is connected to the swing frame.

8. The bearing system according to claim 1, wherein said coupling system is connected with a support structure, said spring rods being suspended from said coupling system, and said lower ends of said spring rods support the swing frame.

9. The bearing system according to claim 1, wherein said articulation joint is a deformable structural element arranged between said coupling system and said second structural component.

10. The bearing system according to claim 9, wherein said deformable structural element forming said articulation joint is a pressure-loaded structural element.

11. The bearing system according to claim 9, wherein said deformable structural element forming said articulation joint is a bending tension bar loaded by tensile force.

12. The bearing system according to claim 4, wherein said coupling system is a frame-like structure surrounding a window, and said connection articulation joint is a bending tension bar acted upon by tensile force arranged in said window, wherein said structural element transmits the load from said second structural component to a leg of said frame facing away from said coupling axis.

* * * * *

UNITED STATES PATENT AND TRADEMARK OFFICE
CERTIFICATE OF CORRECTION

PATENT NO.     : 6,745,893 B2
DATED          : June 8, 2004
INVENTOR(S)    : Von Wedel It is certified that error appears in the above-identified patent and that said Letters Patent is hereby corrected as shown below:

Column 7,
Line 37, please change the word "or" to -- of --.

Column 8,
Line 35, please delete the word "connection."

Signed and Sealed this

Tenth Day of August, 2004

JON W. DUDAS
*Acting Director of the United States Patent and Trademark Office*

UNITED STATES PATENT AND TRADEMARK OFFICE
CERTIFICATE OF CORRECTION

PATENT NO. : 6,745,893 B2
APPLICATION NO. : 10/121142
DATED : June 8, 2004
INVENTOR(S) : Nicolaas Van Diepen It is certified that error appears in the above-identified patent and that said Letters Patent is hereby corrected as shown below:

Title Page, correct Item (12) "Von Wedel" to -- Van Diepen --.

Title Page, correct Item (75) Inventors, to read:

-- Nicolaas Van Diepen, Garbsen (DE) --.

Signed and Sealed this
Thirteenth Day of January, 2015

Michelle K. Lee
*Deputy Director of the United States Patent and Trademark Office*